(12) United States Patent
Inoguchi

(10) Patent No.: US 6,853,356 B2
(45) Date of Patent: Feb. 8, 2005

(54) OPTICAL SYSTEM AND IMAGE DISPLAYING APPARATUS USING THE SAME

(75) Inventor: Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 09/828,143

(22) Filed: Apr. 9, 2001

(65) Prior Publication Data

US 2002/0167463 A1 Nov. 14, 2002

(30) Foreign Application Priority Data

Feb. 5, 2001 (JP) ........................................ 2001-028299

(51) Int. Cl.$^7$ ................................................ G09G 5/00
(52) U.S. Cl. .......................................... 345/8; 359/360
(58) Field of Search ........................ 345/7, 8; 359/630, 359/632, 633

(56) References Cited

U.S. PATENT DOCUMENTS

| | | | | |
|---|---|---|---|---|
| 5,453,877 | A | * | 9/1995 | Gerbe et al. ................ 359/633 |
| 5,940,218 | A | * | 8/1999 | Takahashi ................... 359/630 |
| 6,023,373 | A | * | 2/2000 | Inoguchi et al. ............ 359/633 |
| 6,094,241 | A | * | 7/2000 | Yamazaki .................... 349/11 |
| 6,201,646 | B1 | | 3/2001 | Togino et al. .............. 359/629 |
| 6,252,728 | B1 | | 6/2001 | Togino ....................... 359/834 |
| 6,310,736 | B1 | | 10/2001 | Togino ....................... 359/834 |
| 6,317,267 | B1 | * | 11/2001 | Takahashi ................... 359/630 |
| 6,342,871 | B1 | | 1/2002 | Takeyama ..................... 345/7 |
| RE37,579 | E | * | 3/2002 | Takahashi ................... 359/633 |
| 6,396,639 | B1 | * | 5/2002 | Togino et al. .............. 359/630 |

* cited by examiner

Primary Examiner—Amare Mengistu
(74) Attorney, Agent, or Firm—Fitzpatrick, Cella, Harper & Scinto

(57) ABSTRACT

The present invention has as its object to provide an optical system which can generally be easily made compact and light in weight and wide in angle of field when image information displayed on a display unit such as a liquid crystal display is observed, and an image displaying apparatus using the same. To achieve this object, the optical system according to the present invention is an optical system for directing a beam from the display unit to a predetermined position to thereby enable an observer to observe image information on the display unit, and when a ray emerging from the center of the display surface of the display unit and passing through the center of the exit pupil of the optical system is defined as a central field angle principal ray, the optical system has a first optical element having on the same member a plurality of eccentric reflecting surfaces eccentric relative to the central field angle principal ray and having power, and an eccentric mirror system comprising at least one eccentric mirror eccentric relative to the central field angle principal ray and having power, and directs the beam from the display unit to the first optical element through the intermediary of the eccentric mirror system and directs the beam emerging from the first optical element to the predetermined position.

22 Claims, 6 Drawing Sheets

OPTICAL SYSTEM AND IMAGE DISPLAYING APPARATUS USING THE SAME

BACKGROUND OF THE INVENTION

1. Field of the Invention

This invention relates to an optical system and an image display apparatus using the same, and is suitable for a head mounted display or the like adapted to enlarge and cause image information displayed on display means such as a liquid crystal display element to be observed through an optical element having an appropriately set free curved surface. Also it relates to an optical system suitable for an image pickup (imaging) apparatus enhanced in the degree of freedom of layout by the use of optical elements which has free curved surfaces.

2. Related Background Art

A head mount type image displaying apparatus (head mounted display) using a display element such as a CRT or an LCD and adapted to enlarge and cause an image displayed on this display element to be observed through an optical system is well known.

FIG. 7 of the accompanying drawings is a schematic view of the essential portions of an image displaying apparatus using a coaxial concave mirror according to the prior art. In FIG. 7, a beam from an image displayed on a display element 61 is reflected by a half mirror 62 and is caused to be incident on a concave mirror 63. The beam reflected by the concave mirror 63 is directed to an observer E through the half mirror 62. The image displayed on the display element 61 is formed as a virtual image enlarged by the concave mirror 63. Thereby, the observer observes the enlarged virtual image of the image displayed on the display element 61.

Also, for example, in Japanese Patent Application Laid-Open No. 7-333551, Japanese Patent Application Laid-Open No. 8-50256, Japanese Patent Application Laid-Open No. 8-160340 and Japanese Patent Application Laid-Open No. 8-179238, there are proposed image displaying apparatuses each of which uses an LCD (liquid crystal display) as display means for displaying an image and a thin type prism as an observation optical system and has generally been made thin.

FIG. 8 of the accompanying drawings is a schematic view of the essential portions of an image displaying apparatus proposed in Japanese Patent Application Laid-Open No. 7-333551. In FIG. 8, a light emitted from an LCD 51 is caused to be incident on the incidence surface 53 of a compact prism 52. The beam is folded between a total reflection surface 54 having a curvature formed on the compact prism 52 and a reflecting surface 55, whereafter the beam is caused to emerge from the compact prism 52 through the surface 54 and is directed to an observer E. Thereby, the virtual image of an image displayed on the display means (LCD) 51 is formed and the observer E may observe this virtual image. The reflecting surface 55 of the compact prism 52 comprises an eccentric free curved surface comprised of an eccentric non-rotation-symmetrical surface (a surface differing in optical power depending on the azimuth angle, i.e., a so-called free curved surface or free-form surface).

The type of the optical system shown in FIG. 8, as compared with the type using the prior-art coaxial concave mirror shown in FIG. 7, has the feature that the thinning of the entire apparatus and the widening of the angle of observation field are easy.

Heretofore, the image displaying apparatuses such as the head mounted display and a spectacle type display have been required to be generally downsized and made lighter in weight because these apparatuses are mounted on the head. Particularly, when the weight balance, appearances, etc. of the apparatus are taken into consideration, it is preferable that the apparatus be thin in the direction of observer's visual axis. Also, it is an important task to widen the angle of observation field to give power to the observation of the image displayed on the display means.

In recent years, the higher definition of an LCD or the like which is display means for displaying an image has been advanced, and there has been developed an LCD which has substantially the same number of pixels as in the prior art and is more compact than the prior-art article. Again in a case where such compact display means is used, it is desired to achieve an angle of field similar to that in the prior art.

In Japanese Patent Application Laid-Open No. 10-153748, an eccentric prism optical system and a relay lens system having refractive power are combined together, and image information displayed on display means is once formed as an intermediate image by the relay lens system, and then the image displayed on the display means is directed to an observer, whereby the wider angle of field of the optical system is achieved relative to the panel size.

As further improvements in the optical performance of this publication, optical systems of a type in which the internal reflecting surfaces of the eccentric prism are increased and the intermediate image of the image information displayed on the display means is formed in the eccentric prism and the intermediate image is directed to the observer, a type in which a second eccentric prism is provided to form an intermediate image, and a first eccentric prism leads the intermediate image to an observer, etc. are disclosed in Japanese Patent Application Laid-Open No. 2000-066106, Japanese Patent Application Laid-Open No. 2000-105338, Japanese Patent Application Laid-Open No. 2000-131614 and Japanese Patent Application Laid-Open No. 2000-199853. All of these optical systems are comprised of prism members, so these optical systems are not enough to be light weight.

Also, Japanese Patent Application Laid-Open No. 2000-206446, Japanese Patent Application Laid-Open No. 2000-221440, etc. disclose optical systems in which a prism is used as a relay optical system and a mirror is used as an eyepiece optical system. In Japanese Patent Application Laid-Open No. 2000-206446, the eyepiece optical system is comprised of a half mirror and a concave mirror and therefore, the thinning of the optical system has been difficult and the loss of quantity of light has tended to become great. Also, in Japanese Patent Application Laid-Open No. 2000-221440, the eyepiece optical system is comprised of an eccentric mirror and therefore, the thinning of the entire system is difficult.

SUMMARY OF THE INVENTION

It is an object of the present invention to provide an optical system in which when image information displayed on display means such as a liquid crystal display is to be observed, the compactness, lighter weight and wider angle of field of the entire apparatus are easy to realize, and an image displaying apparatus using the same.

It is also an object of the present invention to provide, in an image pickup apparatus such as a CCD camera, an image pickup optical system which enhances the degree of freedom of layout and achieves thinning and lighter weight.

An optical system according to an embodiment of the present invention is an optical system by which a beam from display means is directed to a predetermined position and an observer can observe image information on the display means, characterized in that when a ray emerging from the center of the display surface of the display means and passing through the center of the exit pupil of the optical system is defined as the central field angle principal ray, the optical system has a first optical element having on the same medium a plurality of eccentric reflecting surfaces eccentric relative to the central field angle principal ray and having power, and an eccentric mirror system comprising at least one eccentric mirror eccentric relative to the central field angle principal ray and having power, and directs the beam from the display means to the first optical element through the intermediary of the eccentric mirror system and directs the beam emerging from the first optical element to the predetermined position.

The optical system may preferably have refractive power which can form an intermediate image in an optical path leading from the display means to the predetermined position.

Also, the eccentric mirror system may preferably have positive power.

Also, the eccentric mirror system may preferably be designed such that in a plane formed by the central field angle principal ray, the angle formed when rays passing from the center of the display surface of the display means to the opposite ends of the exit pupil emerge from the display means and is incident on a first mirror of the eccentric mirror system is defined as θin, and the angle formed when the rays passing from the center of the display surface of the display means to the opposite ends of the exit pupil emerge from the last eccentric mirror of the eccentric mirror system is defined as θout, and the angle formed when the point of intersection is formed on a reflected side when the rays passing from the center of the display surface of the display means to the opposite ends of the exit pupil are extended is defined as positive, and the angle formed when the aforementioned point of intersection is formed on the opposite side is defined as negative, $$0 \leq \theta out/\theta in \leq 1$$

is satisfied.

Also, it is preferable that when the combined focal length of the generatrix cross-section of the eccentric mirror system is defined as fy, and among the eccentric mirrors constituting the eccentric mirror system, the shortest local meridional cross-section focal length is defined as fy min, $$0.5 < fy\ min/fy < 2$$

be satisfied.

Further, the first optical system may preferably have a reflecting and transmitting surface having power serving as an eccentric reflecting surface and a transmitting surface.

Further, it is preferable that the reflecting and transmitting surface have a common area on which both of a reflected beam and a transmitted beam impinge, and the reflection on at least this common area be the total reflection in the first optical element.

Further, it is preferable that reflecting film be formed on a portion of the reflecting and transmitting surface.

Further, it is preferable that the intermediate image be formed larger than the image displayed on the display means.

Further, it is preferable that at least a portion of the intermediate image be formed in the first optical element.

Further, it is preferable that the display surface of the display means be a flat surface and the intermediate image be curvedly formed.

Further, it is preferable that at least one of the eccentric reflecting surfaces be of a non-rotation-symmetrical shape having only one symmetrical plane.

Further, it is preferable that the frequency of reflection in the first optical element be three or less times.

Further, the image displaying apparatus of the present invention may preferably have the above-described optical system and display means for displaying image information.

Further, it is preferable that the optical system be an optical system for directing a beam from display means to a predetermined position, and when a ray emerging from the center of the display surface of the display means and passing through the center of the exit pupil of the optical system is defined as the central field angle principal ray, the optical system have a first optical element having on the same member a plurality of eccentric reflecting surfaces eccentric relative to the central field angle principal ray and having power, and an eccentric mirror system having at least one eccentric mirror eccentric relative to the central field angle principal ray and having power, and be designed so as to direct the beam from the display means to the first optical element through the intermediary of the eccentric mirror, direct the beam emerging from the first optical element to the predetermined position and present to an observer the enlarged image of an image displayed on the display means.

Further, the head mount display of the present invention may preferably have the above-described image displaying apparatus.

Further, it is preferable that the optical system be an optical system for imaging and when a ray incident from the entrance pupil of the optical system and passing to the center of the imaging plane is defined as the central field angle principal ray, the optical system have a first optical element having on the same medium a plurality of eccentric reflecting surface eccentric relative to the central field angle principal ray and having power, and at least one eccentric mirror eccentric relative to the central field angle principal ray and having power, and direct the beam passed through the entrance pupil to the eccentric mirror through the first optical element.

Further, the image pickup apparatus of the present invention may preferably have the above-described optical system and image pickup means for picking up image information formed by the optical system.

DESCRIPTION OF THE PREFERRED EMBODIMENTS

First Embodiment

Figure 1:
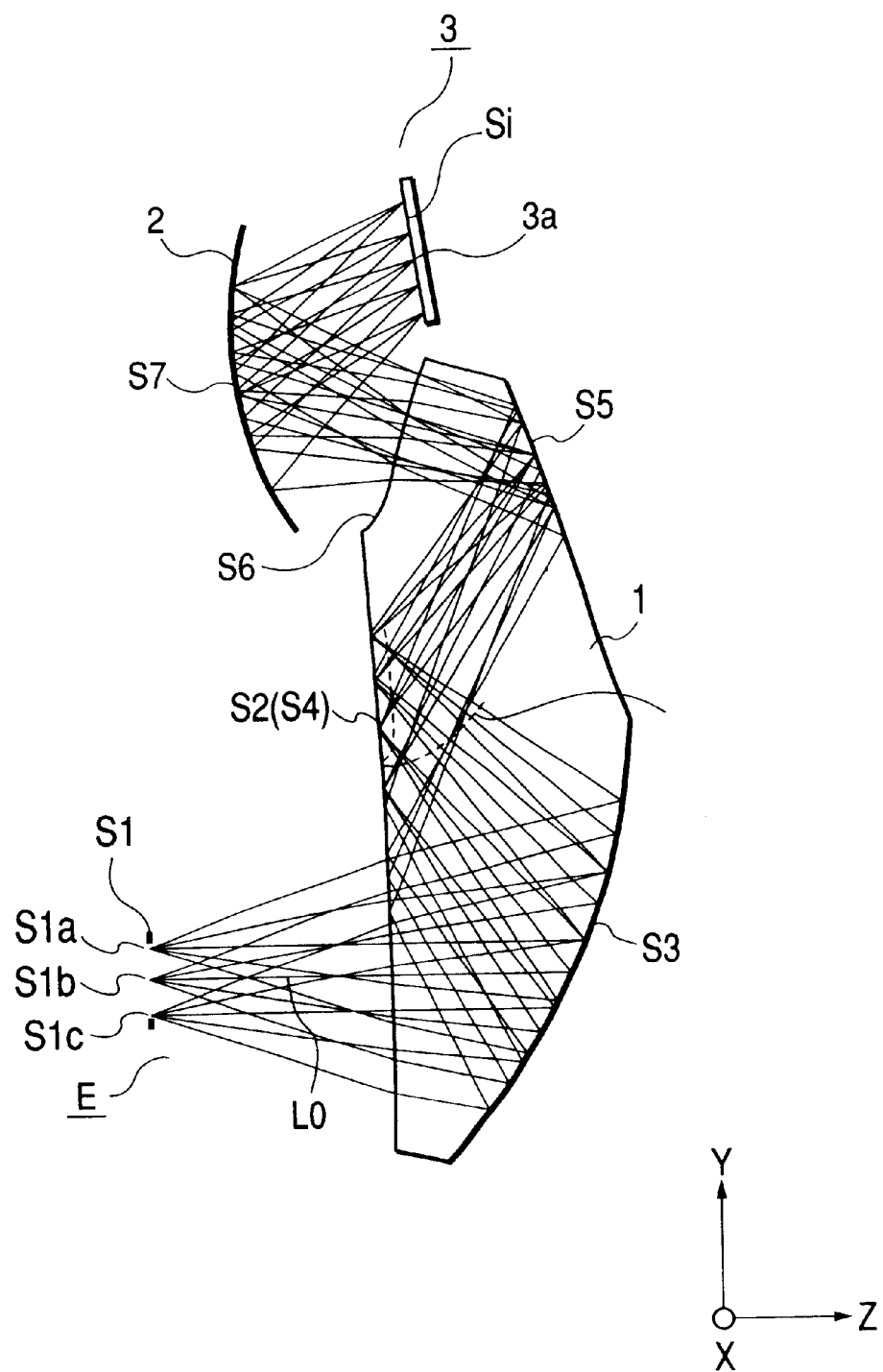
FIG. 1 is a schematic view of the essential portions of an image displaying apparatus using first embodiment of the optical system of the present invention.

FIG. 1 is a schematic view of the essential portions of first embodiment of an image displaying apparatus using the optical system of the present invention.

In FIG. 1, the reference numeral 1 designates a first optical element, and the reference numeral 2 denotes an eccentric mirror (surface reflecting mirror) system having a reflecting surface S7, and in the present embodiment, the first optical element 1 and the eccentric mirror system 2 together constitute an element of the optical system. The reference numeral 3 designates an LCD (liquid crystal display element) which is display means in the present embodiment. Image information obtained by image pickup means (not shown) or image information made by a computer or the like is displayed on the image displaying surface Si of the LCD 3.

Also, S1 in FIG. 1 denotes an exit pupil formed by the optical system of the present embodiment, and in the order of the reverse ray trace leading from this exit pupil S1 to the image displaying surface Si of the LCD 3, optical data (the disposition and surface shape of each surface) are shown in Table 1 which will be described later.

A beam based on image information emitted from the LCD 3 is reflected by the eccentric mirror 2 and is directed through the incidence surface S6 of the first optical element 1 into the first optical element 1. The first optical element 1 reflects the beam from the incidence surface S6 by a reflecting surface S5, a reflecting surface (total reflection surface) S4 and a reflecting surface S3 in the named order, and thereafter makes the beam travel obliquely from a transmitting surface S2 of the same shape as the reflecting surface S4, and directs it to a pupil S1 for observation.

Thereby the virtual image (enlarged image) of the image displayed on the display means (LCD) 3 may be formed and this virtual image may be observed from the pupil S1 of an observer E. Surfaces S2 to S7 comprise eccentric free curved surfaces comprised of eccentric non-rotation-symmetrical surfaces (surfaces differing in optical power depending on the azimuth angles thereof, i.e., so-called free curved surfaces).

In the present embodiment, when the numerical values in the tables which will be described later are all represented in the unit of mm, the enlarged image is formed at a distance of 2000 mm from the exit pupil S1, and the size of the display screen Si of the LCD 3 is 11.4 mm×10.4 mm, the angle of field in x direction is 50°, the angle of field in y direction is 38.6°, and the diameter of the pupil is 8 mm.

The numerical values shown in Table 1 will hereinafter be described.

The leftmost item S indicates surface numbers. S1 indicates the pupil surface, and S2 indicates the surface S2. The same shall apply hereinafter. The surface number i indicates the image displaying surface in the present embodiment.

x, y, z and a are the positions (x, y, z) of the surface vertexes of respective surfaces in a coordinate system wherein the center of the exit pupil surface S1 is the origin (0, 0, 0) and the x-axis is plotted in the inward direction in the plane of the drawing sheet with respect to the y-axis and the z-axis shown in FIG. 1, and the rotation angle a (unit: degree) about the x-axis with the counter-clockwise direction in the drawing as the positive direction. In the column of the surface shape, a symbol SPH is given to surfaces having a spherical shape, and the numerical value of the radius of curvature γ is indicated in the parentheses beside it. Surfaces indicated as FFS in the same column are non-rotation-symmetrical surfaces, and in the present embodiment, they are of a shape conforming to the following expression (1), in which only the coefficients which are not 0 are indicated as C**.

$$Z = 1/2 * (1/A + 1/B) * (y^2 * \cos(W)2 + x2)/\cos(W)/ \quad (1)$$
$$(1 + 1/2 * (1/A - 1/B) * y * \sin(W) + (1 + (1/A - 1/B) * y * z$$
$$\text{in } (W) - (1/A/B + 1/4 * \tan(W)2 * (1/A + 1/B)2) * x2(1/2) +$$
$$C20 * x2 + C11 * x * y + C02 * y2 + C30 * x3 +$$
$$C21 * x2 * y + C12 * x * y2 + C03 * y^3 + C40 * x4 +$$
$$C31 * x3 * y + C22 * x2 * y2 + C13 * x * y3 +$$
$$C04 * y4 + C50 * x5 + C41 * x4 * y + C32 * x3 * y2 +$$
$$C23 * x2 * y3 + C14 * x * y4 + C05 * y5 + C60 * x6 +$$
$$C51 * x5 * y + C42 * x4 * y2 + C33 * x3 * y3 +$$
$$C24 * x2 * y4 + C15 * x * y5 + C06 * y6 + \cdots$$

That is, in the above expression, C mn represents the coefficient of $x^m * y^n$.

In the embodiments of the present invention, each surface is a non-rotation-symmetrical surface (and plane symmetrical surface) having yz surface as a symmetrical plane and therefore, terms of the odd orders of x do not occur and each surface may be defined by an expression in which these are omitted in advance. Also, while in the embodiments of the present invention, the surface shapes are all expressed by the above expression (1), they may of course be expressed by other expression. For example, there is the expression of the surface shape by the following expression (2), and the embodiments of the present invention may be expressed by expression (2). In expression (2), the terms of the odd orders of x are omitted in advance.

$$z = (1 + R) * (x2 * y2)/(1 + (1 - (1 + k) * (1/R)2 * (x2 + y2))(1/2)) + \quad (2)$$
$$z1 + z3 * y + z4 * (x2 - y2) + z5 * (-1 + 2 * x2 + 2 * y2) +$$
$$z9 * (-2 * y + 3 * x2 * y + 3 * y3) +$$
$$z10 * (3 * x2y - y3) + z11 * (x4 - 6 * x2 * y2 + y4) +$$
$$z12 * (-3 * x2 + 4 * x4 + 3) * y2 - 4 * y4) +$$
$$z13 * (1 - 6 * x2 + 6 * x4 - 6 * y2 + 12 * x2 * y2 + 6 * y4)z19 *$$
$$(3 * y - 12 * x2 * y + 10 * x4 * y - 12 * y3 + 20 * x2 * y3 + 10 * y5) +$$
$$z20 * (-12 * x2 * y + 15 * x4y3 + 10 * x2 * y3 - 5 * y5) +$$
$$z21 * (5 * x4 * y - 10 * x2 * y3 + y5) +$$
$$z22 * (x6 - 15 * x4 * y2 + 15 * x2 * y4 - y6) +$$
$$z23 * (-5 * x4 + 6 * x6 + 30 * x2 * y2 -$$
$$30 * x4 * y2 - 5 * y4 - 30 * x2 * y4 + 6 * y6) +$$
$$z24 * (6 * x2 - 20 * x4 + 15 * x6 - 6 * y2 + 15 * x4 * y2 +$$
$$20 * y4 - 15 * x2 * y4 - 15 * y60 +$$
$$z25 * (-1 + 12 * x2 - 30 * x4 + 20 * x6 + 12 * y2 - 60 * x2 * y2 +$$
$$60 * x4 * y2 - 30 * y4 + 60 * x2 * y4 + 20 * y6)$$

In the column of medium of Table 1, the refractive indices and Abbe numbers of the mediums of the subsequent surfaces are indicated by nd and vd, respectively. When the medium is air, the refractive index is represented as nd: 1, and the Abbe number vd is omitted. The surfaces indicated as REFL in the column of medium are reflecting surfaces, and are represented on the premise that the preceding medium is taken over. Also, the mediums subsequent to the image plane Si optically have no meaning and therefore are not indicated.

Before describing the image displaying apparatus of the present invention, description will be made of the definitions of the meridional cross-section, the sagittal cross-section, the local meridional cross-section and the local sagittal cross-section used in the present invention. In the definition of the conventional coaxial system which does not correspond to an eccentric system, assuming that in each surface vertex coordinate system, the z-axis is the optical axis, yz cross-section is the conventional meridional cross-section and xz cross-section is the conventional sagittal cross-section. Since the present invention is an eccentric system, the local meridional cross-section and the local sagittal cross-section corresponding to the eccentric system will be newly defined. The plane containing the incident light and emergent light of the central field angle principal ray on the hit point between the central field angle principal ray LO and each surface is defined as the local meridional cross-section, and the plane containing the hit point and perpendicular to the local meridional cross-section and parallel to the xz cross-section of each surface vertex coordinate system is defined as the local sagittal cross-section. When the radius of curvature of the local meridional cross-section is defined as γy and the radius of curvature of the local sagittal cross-section is defined as γx and the refractive indices of the surface before and behind the pertinent surface are defined as nd and nd', respectively, fy given by fy=γy/(nd'−nd) is defined as the local meridional cross-section focal length, and fx given by fx=γx/(nd'−nd) is defined as the local sagittal cross-section focal length. Also, φy and φx given by φy=1/fy and φx=1/fx are defined as the local meridional cross-section power and the local sagittal cross-section power, respectively of each surface. Now, when the ith local meridional cross-section power is defined as φyi and the value obtained by the distance between the hit point between the ith optical surface and the central field angle principal ray LO and the hit point between the i+1th optical surface and the central field angle principal ray LO being divided by the refractive index of the medium therebetween is defined as the converted surface interval ei', the inverse number fy mn of the combined power φy mn of the mth surface to the nth surface found in the same manner as the paraxial pursuit calculation is defined as the meridional cross-section combined focal length from the mth surface to the nth surface.

All of the above definitions describing Table 1 likewise hold true in the subsequent embodiments.

The optical action of each member in the present embodiment will hereinafter be described. The ray emerging from the center 3a on the image displaying surface Si of the LCD 3 and passing through the optical system of the present embodiment to the center S1b of the exit pupil S1 formed by the optical system is called the central field angle principal ray LO. The beam emerging from the image displaying surface Si of the LCD 3 is reflected by the mirror surface S7 of the eccentric mirror 2 eccentric relative to the central field angle principal ray LO and having power and travels toward the first optical element 1. The beam is incident on the first optical element 1 from the surface S6 and travels toward a curved surface S5. The surface S5 is disposed eccentrically relative to the central field angle principal ray LO and therefore reflects the beam in a direction different from the incidence side. The beam reflected by the surface S5 is reflected by a curved surface S4 disposed eccentrically relative to the central field angle principal ray LO so that a part of the beam may be incident at such an angle that it is internally totally reflected. The beam reflected by the surface S4 is reflected by a curved surface S3 disposed eccentrically relative to the central field angle principal ray LO, is incident on a surface S2 (the same surface as the surface S4) at an angle which does not cause internal total reflection, emerges from the first optical element 1 through the surface S2 and forms the exit pupil S1. The observer E places the pupil S1 near the exit pupil S1 corresponding to a predetermined position in the present embodiment, thereby making it possible to see the enlarged image of the image displayed on the LCD 3.

In the present embodiment, any of the internal reflecting surfaces S5, S4 and S3 of the first optical element 1 disposed eccentrically relative to the central field angle principal ray LO and having power is formed with reflecting film of a metal or a dielectric material to thereby reflect the beam. However, the surface S4 is made eccentric at such an angle that a part of the beam is internally totally reflected, whereby the portion the beam emerging from at least the surface S2 passes is not provided with the aforementioned reflecting film to thereby achieve the compactness and light utilization efficiency of the optical system. That is, reflecting film is formed on a portion of the surface which is the aforementioned reflecting and transmitting surface to thereby alleviate the condition so that the total reflection condition need not be established for all effective beams, thereby improving the degree of freedom of design. Also, the reflecting surface S4 and the transmitting surface S2 are made into the same surface to thereby curtail the number of necessary surfaces, and this decreases the number of steps during the manufacture and contributes to the curtailment of the cost.

Figure 5:
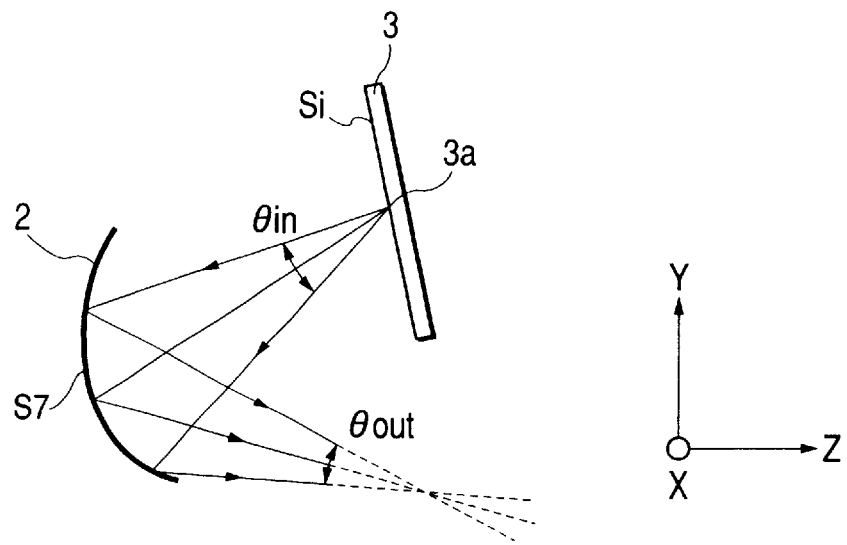
FIG. 5 is an illustration of a portion of the optical system of the present invention.

Also, the mirror surface S7 of the only eccentric mirror 2 constituting the eccentric mirror system in the present embodiment has positive power, and in such a manner as to condense the beam emerging from the image displaying surface Si and direct it to the first optical element 1, the effective area of the incidence surface S7 of the first optical element 1 is made small to thereby contribute to the downsizing of the entire optical system. Particularly, when in yz plane formed by the central field angle principal ray Lo as shown in FIG. 5, the angle formed when rays passing from the center 3a of the display surface of the display means 3 to the opposite ends S1a and S1c of the exit pupil S1 emerge from the LCD 3 and incident on the eccentric mirror 2 which is a first mirror of the eccentric mirror system is defined as θin, and the angle formed when the rays passing from the center 3a of the display surface of the display means to the opposite ends S1a and S1c of the exit pupil S1 emerge from the eccentric mirror 2 which is the last eccentric mirror of the eccentric mirror system is defined as θout, and the angle formed when the point of intersection is formed on the reflected side when the rays passing from the center 3a of the display surface of the display means to the opposite ends S1a and S1c of the exit pupil S1 are extended is defined as positive and the angle formed when the point of intersection is formed on the opposite side is defined as negative, design is made such that $$0 \leq \theta out/\theta in \leq 1 \quad (3)$$

is satisfied, whereby the effect of making the effective area of the incidence surface S6 of the first optical element 1 small and downsizing the entire optical system is more displayed. If the lower limit of expression (3) is exceeded, the divergent beam emerging from the LCD 3 will be incident on the first optical element 1 in its divergent state and it will become difficult to make the effective area of the incidence surface S6 of the first optical element 1 small. Also, if the upper limit of expression (3) is exceeded, an intermediate image will be formed at a position far relative to the surface S3 of the first optical element 1 which is a surface strongest in power, and the position of the exit pupil will become near to the surface S2 which is the emergence surface of the first optical element 1, and it will become difficult to secure the eye relief.

When the meridional cross-section combined focal length of the eccentric mirror system 2 is defined as fy, and among the eccentric mirrors constituting the eccentric mirror system 2, the shortest local meridional cross-section local focal length is defined as fy min, design is made such that $$0.5 < fy\ min/fy < 2 \qquad (4)$$

is satisfied, whereby there is provided an appropriate power arrangement. In the present embodiment, the eccentric mirror system is comprised of only one eccentric mirror 2 (surface S7) (the eccentric mirror system may be comprised of a plurality of eccentric mirrors) and therefore, fy=f77=f7 and the focal length fy min of the surface which is shortest in the local meridional cross-section local focal length, that is, strongest in power, is fy min=f7 and therefore, the above-mentioned conditional expression naturally becomes 1.

Also, in the present embodiment, the intermediate image (indicated by dotted line) is formed in an optical path leading from the display surface Si of the LCD 3 to the exit pupil S1, whereby the length of the optical path from the exit pupil S1 to the intermediate image is shortened and a wider angle of field is achieved. As regards the position at which the intermediate image is formed, the intermediate image is formed between the surface S7 which is at least the first optical surface from the display surface Si and the surface S2 which is the first optical surface from the exit pupil. Further, it is preferable that the intermediate image be formed between the surface S6 which is at least the second optical surface from the display surface Si and the surface S3 which is the second optical surface from the surface S1 of the exit pupil. The former is effective to form the intermediate image of the display surface Si by the use of at least two surfaces to thereby make the two surfaces share the power for the formation of the intermediate image and restrain the occurrence of more than necessary aberrations, and the latter is for preventing the thickness of the first optical element 1 from becoming great because if only the surface S2 is made to bear the power for directing the beam to the surface S1 of the exit pupil, the thickness of the first optical element 1 will become great. Accordingly, in the present embodiment, design is made such that the intermediate image is curvedly formed in the first optical element 1, and more particularly, between the surface S6 which is the incidence surface of the first optical element 1 and the last internal reflecting surface S3 of the first optical element 1.

Also, in the present embodiment, a plurality of optical surfaces having power are eccentrically disposed and therefore, eccentric aberration which does not occur in a coaxial optical system occurs, but by making the optical surfaces into non-rotation-symmetrical surfaces, the eccentric aberration is corrected well. It is desirable to provide a non-rotation-symmetrical surface on at least one of the eccentric reflecting surfaces which precedes the intermediate image and a non-rotation-symmetrical surface on the surface which succeeds to the intermediate image to thereby correct the eccentric aberration. Particularly desirably, all reflecting surfaces are made into non-rotation-symmetrical surfaces, whereby it becomes easy to correct the eccentric aberration better. In the present embodiment, all optical surfaces are made into a non-rotation-symmetrical shape having y-z plane as the only symmetrical plane to thereby correct the eccentric aberration and obtain good optical performance.

In the present embodiment, the surface S3 may be made into a half-transmitting surface so that external world information and the image information displayed on the display means 3 may be spatially superposed one upon the other and observed. At this time, it is more preferable to use such a correction optical element which enables the external world information to be observed without distortion. This also holds true in the following embodiments.

Second Embodiment

Figure 2:
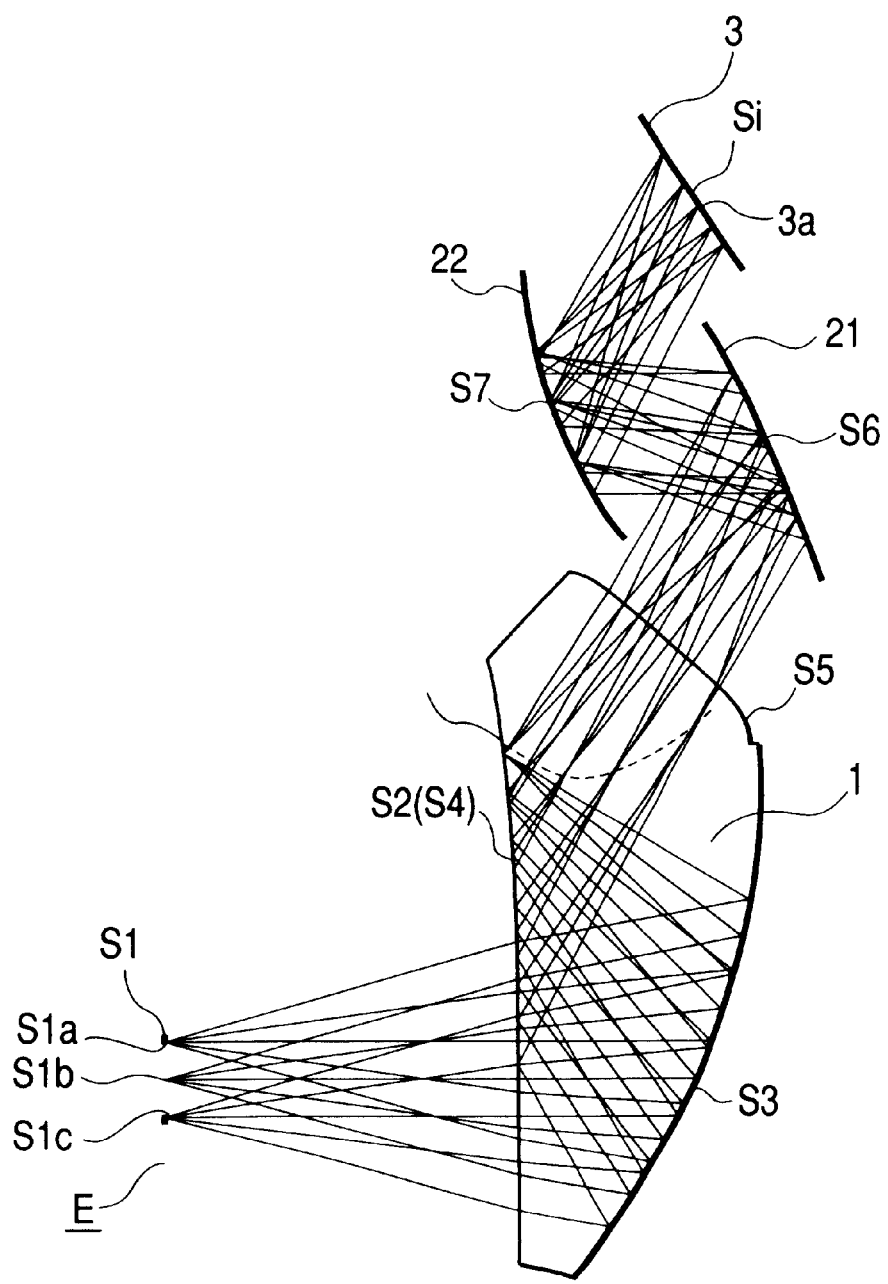
FIG. 2 is a schematic view of the essential portions of an image displaying apparatus using second embodiment of the optical system of the present invention.

FIG. 2 is a schematic view of the essential portions of second embodiment of the image displaying apparatus of the present invention. In FIG. 2, the reference numeral 1 designates a first optical element, and the reference numerals 21 and 22 denote eccentric mirrors (surface reflecting mirrors) having reflecting surfaces S7 and S6, respectively, and in the present embodiment, the optical element 1 and the eccentric mirrors 21 and 22 together constitute an element of the optical system. The reference numeral 3 designates an LCD which is display means in the present embodiment.

Also, S1 in FIG. 2 denotes an exit pupil formed by the optical system of the present embodiment, and in the order of the reverse ray trace from this exit pupil S1 to the image displaying surface Si of the LCD 3, optical data (the disposition and surface shape of each surface) are shown in Table 2.

In the present embodiment, an enlarged image is formed at a distance of 2000 mm from the exit pupil S1, and the size of the display screen Si of the LCD 3 is 10.9 mm×6.1 mm, the angle of field in x direction is 40°, the angle of field in y direction is 30.5° and the diameter of the pupil is 4 mm.

The definitions of respective items in Table 2 are the same as what has been described in connection with Table 1 and therefore need not be described.

The optical action in the present embodiment will hereinafter be described. A beam emerging from the image displaying surface Si of the LCD 3 is reflected by the mirror surface S7 of an eccentric mirror 22 eccentric relative to the central field angle principal ray LO and having power. The beam reflected by the surface S7 is reflected by the mirror surface S6 of an eccentric mirror 21 eccentric relative to the central field angle principal ray LO and having power and travels toward the first optical element 1.

The beam is incident on the first optical element 1 from a surface S5 and travels toward a curved surface S4. The surface S4 is disposed eccentrically relative to the central field angle principal ray LO, and is inclined at an angle for internally totally reflecting an effective beam relative to the medium of the first optical element 1. The beam totally reflected by the surface S4 is reflected by a surface S3 disposed eccentrically relative to the central field angle principal ray LO, and is incident on a surface S2 (the same surface as the surface S4) at an angle which does not cause internal total reflection, emerges from the first optical element 1 through the surface S2 and forms the exit pupil S1. The observer E places a pupil S1 near the exit pupil S1 to thereby make it possible to see the enlarged image of an image displayed on the LCD 3.

In the present embodiment, among the internal reflecting surfaces of the first optical element 1, the surface S3 is formed with reflecting film of a metal or a dielectric material, whereby the beam is reflected. The surface S4 is made eccentric at such an angle that the beam directed to the exit pupil is all internally totally reflected, whereby this surface need not be provided with reflecting film, and thereby the compactness of the optical system and an improvement in light utilization efficiency are achieved. Also, the reflecting surface S4 and the transmitting surface S2 are made into the same surface to thereby curtail the number of necessary surfaces, and this decreases the number of steps during the manufacture and contributes to the curtailment of the cost.

Also, the eccentric mirror system in the present embodiment comprising the mirror surface S7 of the eccentric mirror 22 and the mirror surface S6 of the eccentric mirror 21 has positive power as a whole, and makes the effective area of the incidence surface S5 of the first optical element 1 small in such a manner as to condense the beam emerging from the image displaying surface Si and direct it to the first optical element 1, and contributes to the downsizing of the entire optical system. Particularly, when in yz plane formed by the central field angle principal ray LO, the angle formed when rays passing from the center 3a of the display surface of the display means 3 to the opposite ends S1a and S1c of the exit pupil S1 emerge from the LCD and are incident on the eccentric mirror 22 which is a first mirror of the eccentric mirror system is defined as θin, and the angle formed when the rays passing from the center 3a of the display surface of the display means 3 to the opposite ends S1a and S1c of the exit pupil S1 emerge from the eccentric mirror 21 which is the last eccentric mirror of the eccentric mirror system is defined as θout, and the angle formed when the point of intersection is formed on the reflected side when the rays passing from the center of the display surface of the display means to the opposite ends of the exit pupil are extended is defined as positive, and the angle formed when the point of intersection is formed on the opposite side is defined as negative, design is made such that $$0 \leq \theta out/\theta in \leq 1 \tag{3}$$

is satisfied, whereby the effect of making the effective area of the incidence surface S5 of the first optical element 1 small, and downsizing the entire optical system is more displayed. If the lower limit of expression (3) is exceeded, the divergent beam emerging from the LCD 3 will be incident on the first optical element in its divergent state, and it will become difficult to make the effective area of the incidence surface S5 of the first optical element 1 small. Also, if the upper limit of expression (3) is exceeded, the intermediate image will be formed at a position far relative to the surface S3 of the first optical element 1 which is a surface strongest in power, and the position of the exit pupil will become near to the surface S2 which is the emergence surface of the first optical element 1, and it will become difficult to secure the eye relief. When the meridional cross-section combined focal length of the eccentric mirror system is defined as fy, and of the eccentric mirrors constituting the eccentric mirror system, the shortest local meridional cross-section focal length is defined as fy min, design is made such that $$0.5 < fy\ min/fy < 2 \tag{4}$$

is satisfied, whereby there is provided an appropriate power arrangement. In the present embodiment, the eccentric mirror system is comprised of two eccentric mirrors 21 (surface S6) and 22 (surface S7), and fy=fy 67, and the focal length fy min of the surface which is shortest in the meridional cross-section local focal length, that is, strongest in power, is fy min=fy 7. If the lower limit of expression (4) is exceeded, the power of one eccentric mirror in the eccentric mirror system will become too strong and the occurrence of eccentric aberration in this surface will increase, and this is not preferable. Also, if the upper limit of expression (4) is exceeded, it will become difficult to secure the length of the optical path between the plurality of eccentric mirrors constituting the eccentric mirror system, and it will become difficult to provide a thin type layout as the entire optical system.

More preferably, design may be made such that $$0.75 < fy\ min/fy < 1.5 \tag{4a}$$

is satisfied. The problems arising when the upper limit and lower limit of this expression are similar to what has been described above, but the effect becomes higher by the limits having been narrowed.

Also, in the present embodiment, an intermediate image (indicated by dotted line in FIG. 2) is formed in the optical path leading from the display surface Si of the LCD 3 to the exit pupil S1, whereby the length of the optical path from the exit pupil 1 to the intermediate image is shortened and a wider angle of field is achieved. As regards the position at which the intermediate image is formed, the intermediate image is formed between the surface S7 which is at least the first optical surface from the display surface Si and the surface S2 which is the first optical surface from the exit pupil S1. Further, it is preferable that the intermediate image be formed between the surface S6 which is at least the second optical surface from the display surface Si and the surface S3 which is the second optical surface from the surface Si of the exit pupil. The former is because the intermediate image of the display surface Si is formed by the use of at least two surfaces, whereby there is the effect of making the two surfaces shape the power for the formation of the intermediate image and restraining the occurrence of more than necessary aberrations, and the latter is for preventing the thickness of the first optical element 1 from becoming great because if only the surface S2 is made to bear the power for directing the beam to the surface S1 of the exit pupil, the thickness of the first optical element 1 becomes great. Accordingly, in the present embodiment, it is preferable that the intermediate image be formed between the reflecting surface S6 of the eccentric mirror 21 and the last internal reflecting surface S3 of the first optical element 1. In the present embodiment, design is made such that particularly the intermediate image is formed in the first optical element 1, i.e., between the incidence surface S5 and the internal total reflection surface S4, and the surfaces before and after the intermediate image formed are made to appropriately share aberration correction. Also, the intermediate image is curved in advance and formed as shown, thereby reducing the burden of aberration correction in each element constituting the eyepiece optical system subsequent to the formation of the intermediate image. Also, in the present embodiment, the intermediate image is enlargedly formed so as to become larger relative to the image displayed on the display surface Si to thereby contribute to a reduction in the power of the eyepiece optical system, and construct particularly a thin type optical system.

Again in the present embodiment, a plurality of optical surfaces having power are eccentrically disposed and therefore, eccentric aberration which does not occur in a coaxial optical system occurs, but this eccentric aberration can be corrected well by making the optical surfaces into non-rotation-symmetrical surfaces. It is desirable to provide a non-rotation-symmetrical surface on at least one of the eccentric reflecting surfaces which precedes the intermediate image and a non-rotation-symmetrical surface on the surface which succeeds to the intermediate image to thereby correct the eccentric aberration. Particularly desirably, all the reflecting surfaces are made into non-rotation-symmetrical surfaces, whereby it becomes possible to correct the eccentric aberration better. In the present embodiment, all optical surfaces are made into a non-rotation-symmetrical shape (and plane symmetrical shape) having y-z plane as the only symmetrical plane to thereby correct the eccentric aberration and obtain good optical performance.

Third Embodiment

Figure 3:
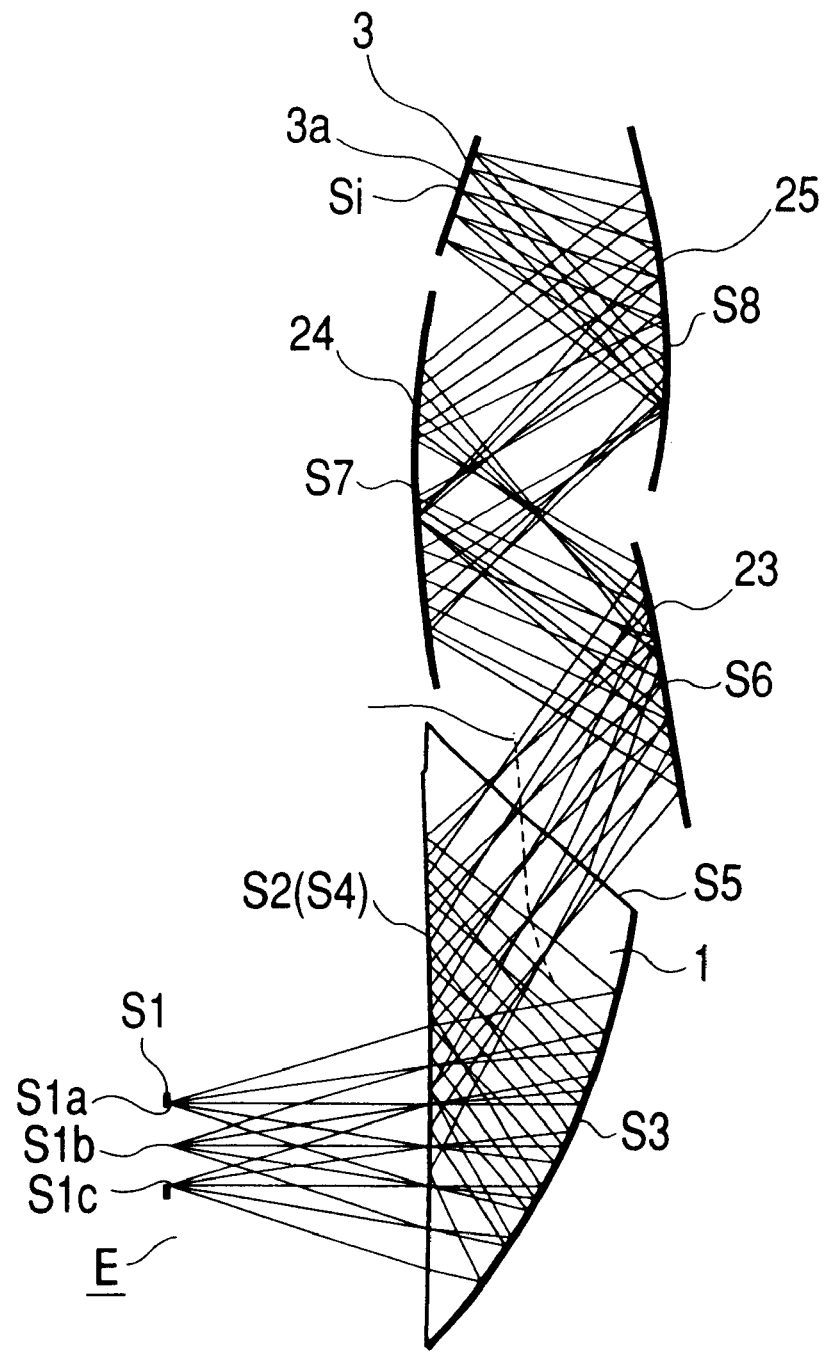
FIG. 3 is a schematic view of the essential portions of an image displaying apparatus using third embodiment of the optical system of the present invention.

FIG. 3 is a schematic view of the essential portions of third embodiment of the image displaying apparatus of the present invention. In FIG. 3, the reference numeral 1 designates a first optical element, and the reference numerals 23, 24 and 25 denote eccentric mirrors (surface reflecting mirrors) having reflecting surfaces S8, S7 and S6, respectively, and in the present embodiment, the optical element 1 and the eccentric mirrors 23, 24 and 25 together constitute an element of the optical system. The reference numeral 3 designates an LCD which is display means in the present embodiment.

Also, S1 in FIG. 3 denote an exit pupil formed by the optical system of the present embodiment, and in the order of the reverse ray trace from this exit pupil S1 to the image displaying surface Si of the LCD 3, optical data (the disposition and surface shape of each surface) are shown in Table 3.

In the present embodiment, the enlarged image is formed at a distance of 2000 mm from the exit pupil S1, and the size of the display screen Si of the LCD 3 is 10.6 mm×7.2 mm, the angle of field in x direction is 45°, the angle of field in y direction is 34.5° and the diameter of the pupil is 6 mm.

The definitions of respective items in Table 3 are the same as what has been described in connection with Table 1 and therefore need not be described.

The action in the present embodiment will hereinafter be described. A beam emerging from the image displaying surface Si of the LCD 3 is reflected by the mirror surface S8 of the eccentric mirror 25 eccentric relative to the central field angle principal ray LO and having power. The beam reflected by the surface S8 is reflected by the mirror surface S7 of the eccentric mirror 24 eccentric relative to the central field angle principal ray LO and having power, and is further reflected by the mirror surface S6 of the eccentric mirror 23 eccentric relative to the central field angle principal ray LO and having power and travels toward the first optical element 1.

The beam is incident on the first optical element 1 from a surface S5 and travels toward a curved surface S4. The surface S4 is disposed eccentrically relative to the central field angle principal ray LO, and is inclined at an angle for internally totally reflecting the effective beam relative to the medium of the first optical element 1. The beam totally reflected by the surface S4 is reflected by a curved surface S3 disposed eccentrically relative to the central field angle principal ray LO, is incident on a surface S2 (the same surface as the surface S4) at an angle which does not cause internal total reflection, emerges from the first optical element 1 through the surface S2 and forms the exit pupil S1.

The observer E places the pupil near the exit pupil S1 to thereby make it possible to see the enlarged image of an image displayed on the LCD 3.

In the present embodiment, of the internal reflecting surfaces of the first optical element 1, the surface S3 is formed with reflecting film of a metal or a dielectric material, whereby the beam is reflected. The surface S4 is made eccentric at such an angle that the beam directed to the exit pupil is all internally totally reflected, whereby it need not be provided with reflecting film, and thereby the compactness of the optical system and an improvement in light utilization efficiency are achieved. Also, the reflecting surface S4 and the transmitting surface S2 are made into the same surface to curtail the number of necessary surfaces, and this decreases the number of steps during the manufacture and contributes to the curtailment of the cost.

Also, the eccentric mirror system of the present embodiment comprising the mirror surface S8 of the eccentric mirror 25, the mirror surface S7 of the eccentric mirror 24 and the mirror surface S6 of the eccentric mirror 23 has positive power as a whole, and in such a manner as to condense the beam emerging from the image displaying surface Si and direct it to the first optical element 1, the effective area of the incidence surface S5 of the first optical element 1 is made small to thereby contribute to the downsizing of the entire optical system. Particularly, when in yz plane formed by the central field angle principal ray LO, the angle formed when rays passing from the center $3a$ of the display surface of the display means 3 to the opposite ends S1$a$ and S1$c$ of the exit pupil S1 emerge from the LCD 3 and are incident on the eccentric mirror 25 which is a first mirror of the eccentric mirror system is defined as θin, and the angle formed when the rays passing from the center $3a$ of the display surface of the display means 3 to the opposite ends S1$a$ and S1$c$ of the exit pupil S1 emerge from the eccentric mirror 23 which is the last eccentric mirror of the eccentric mirror system is defined as θout, and the angle formed when the point of intersection is formed on the reflected side when the rays passing from the center $3a$ of the display surface of the display means 3 to the opposite ends S1$a$ and S1$c$ of the exit pupil S1 are extended is defined as positive and the angle formed when the point of intersection is formed on the opposite side is defined as negative, design is made such that $$0 \leq \theta out/\theta in \leq 1 \quad (3)$$

is satisfied, whereby the effect of making the effective area of the incidence surface S5 of the first optical element 1 small and downsizing the entire optical system is more displayed.

If the lower limit of expression (3) is exceeded, the divergent beam emerging from the LCD 3 will be incident ont he first optical element 1 in its divergent state and it will become difficult to make the effective area of the incidence surface S5 of the first optical element 1 small. Also, if the upper limit of expression (3) is exceeded, an intermediate image will be formed at a position far relative to the surface S3 of the first optical element 1 which is a surface strongest in power, and the position of the exit pupil will become near to the surface S2 which is the emergence surface of the first optical element 1, and it will become difficult to secure the eye relief. When the meridional cross-section combined focal length of the eccentric mirror system is defined as fy, and among the eccentric mirrors constituting the eccentric mirror system, the shortest local meridional cross-section focal length is defined as fy min, design is made such that $$0.5 < fy\ min/fy < 2 \quad (4)$$

is satisfied, whereby there is provided an appropriate power arrangement. In the present embodiment, the eccentric mirror system is comprised of three eccentric mirrors 23 (surface S6), 24 (surface S7) and 25 (surface S8), and fy=fy 68 and the focal length fy min of the surface which is shortest in the local meridional cross-section focal length, that is, strongest in power, is fy min=fy 8. If the lower limit of expression (4) is exceeded, the power of an eccentric mirror in the eccentric mirror system will become too strong and the occurrence of eccentric aberration in this surface will increase, and this is not preferable. Also, if the upper limit of expression (4) is exceeded, it will become difficult to secure the length of the optical path between the plurality of eccentric mirrors constituting the eccentric mirror system, and it will become difficult to provide a thin type layout as the entire optical system.

More preferably, design may be made such that $$0.75 < fy\ min/fy < 1.5 \quad (4a)$$

is satisfied. The problems which will arise if the upper limit and lower limit of this expression are exceeded are similar what has been described above, but by the limits having been narrowed, the effect becomes high.

Also, in the present embodiment, the intermediate image (indicated by dotted line) is formed in an optical path leading from the display surface Si of the LCD 3 to the exit pupil S1, whereby the length of the optical path from the exit pupil 1 to the intermediate image is shortened and a wider angle of field is achieved. As regards the position at which the intermediate image is formed, the intermediate image must be formed between the surface S8 which is at least the first optical surface from the display surface Si and the surface S2 which is the first optical surface from the exit pupil S1. Further, it is preferable that the intermediate image be formed between the surface S7 which is at least the second optical surface from the display surface Si and the surface S3 which is the second optical surface from the exit pupil S1. The former is effective to from the intermediate image of the display surface Si by the use of at least two surfaces to thereby make these surfaces share the power for the formation of the intermediate image and restrain the occurrence of more than necessary aberrations, and the latter is for preventing the thickness of the first optical element 1 from becoming great because if only the surface S2 is made to bear the power for directing the beam to the exit pupil surface Si, the thickness of the first optical element 1 will become great. Accordingly, in the present embodiment, it is preferable that the intermediate image be formed between the reflecting surface S7 of the eccentric mirror 24 and the last internal reflecting surface S3 of the first optical element 1. Further, in the present embodiment, the intermediate image is formed between the reflecting surface S6 of the eccentric mirror 23 and the internal total reflection surface S4 and longitudinally astride the incidence surface S5 of the first optical element 1. That is, design is made such that the formation of the intermediate image is effected chiefly by the three eccentric mirrors 25, 24 and 23 and the intermediate image is directed to the exit pupil through the intermediary of the total reflection surface S4, the reflecting surface S3 and the transmitting surface S2, and the aberration correction in the surfaces before and after the intermediate imaging is appropriately shared. Also, the intermediate image is curvedly formed in advance to thereby reduce the burden of aberration correction in the elements of the eyepiece optical system subsequent to the intermediate imaging. Again in the present embodiment, the intermediate image is formed so as to become larger relative to the image displayed on the display surface Si, and this contributes to a reduction in the power of the eyepiece optical system, and particularly provides a thin type optical system.

Again in the present embodiment, a plurality of optical surfaces having power are eccentrically disposed and therefore, eccentric aberration which does not occur in a coaxial optical system occurs, but this eccentric aberration can be corrected well by making the optical surfaces into non-rotation-symmetrical surfaces. It is desirable to provide a non-rotation-symmetrical surface on at least one of the eccentric reflecting surfaces which precedes the intermediate image and a non-rotation-symmetrical surface on at least one of the surfaces succeeding to the intermediate image to thereby correct the eccentric aberration. Particularly desirably, all the reflecting surfaces are made into non-rotation-symmetrical surfaces, whereby it becomes possible to correct the eccentric aberration better. Again in the present embodiment, all the optical surfaces are made into a non-rotation-symmetrical shape having y-z plane as the only symmetrical plane, whereby the eccentric aberration is corrected and good optical performance is obtained.

In each of the above-described embodiments, an image pickup element such as a CCD is placed instead of the LCD 3 and the disposition of the image pickup surface Si is suitably deviated so that the image pickup surface Si may lie at the best imaging point of light incident from the pupil S1 of the optical system, whereby it is possible to use the optical system of the present invention also as an image pickup apparatus having S1 as the entrance pupil and Si as the imaging plane.

Figure 4:
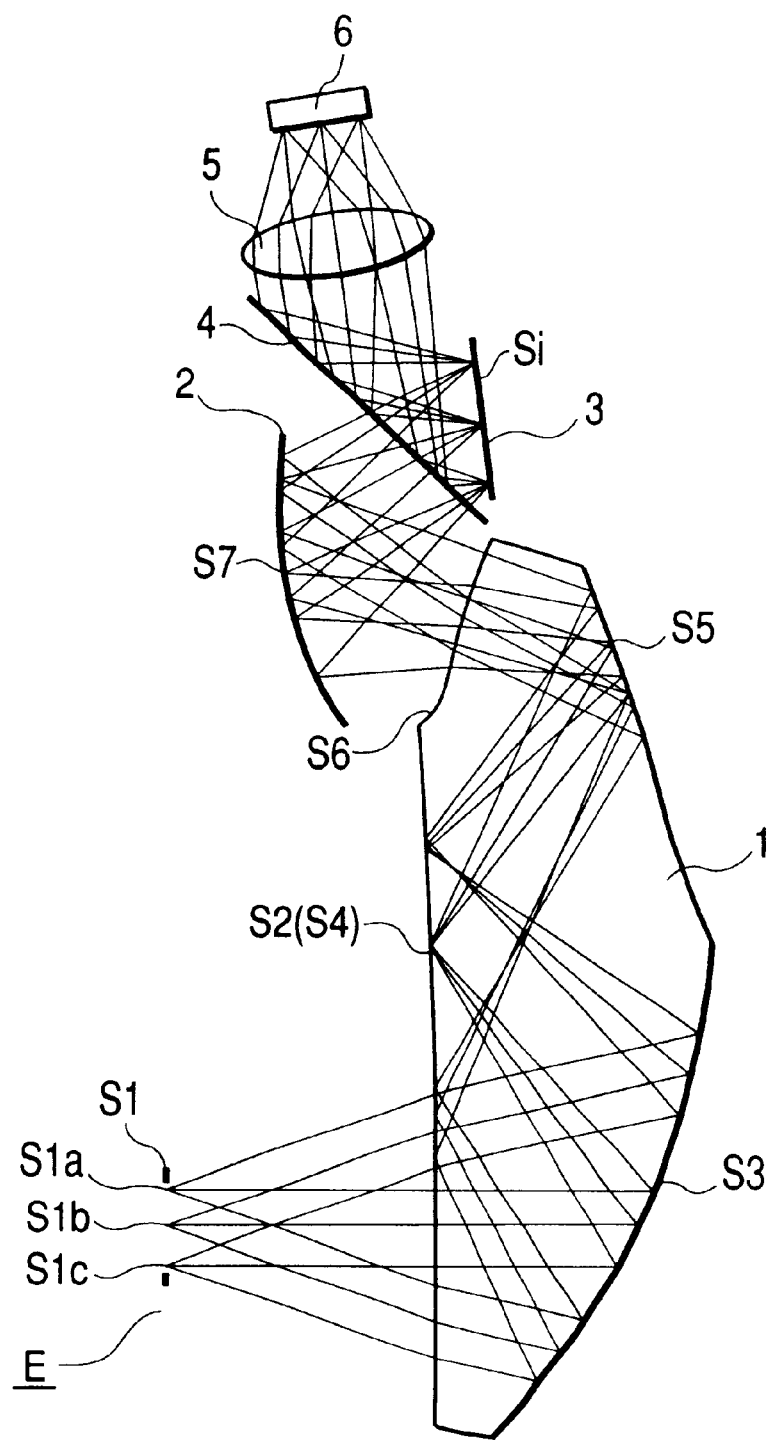
FIG. 4 is a schematic view of the essential portions of another example of the image displaying apparatus using the optical system of the present invention.

Also, as shown in FIG. 4, it is possible to construct the LCD 3 in first embodiment of a reflection type LCD, dispose an illuminating light source, a condensing lens 5 and a half mirror 4, illuminate the reflection type LCD with the light from the illuminating light source 6, direct the image light from the reflection type LCD 3 to the exit pupil position S1 and present an enlarged image to the observer. While the case of first embodiment has been shown here, the other embodiments can be likewise constructed.

TABLE 1

| s | x | y | z | a | Surface shape | medium |
|---|---|---|---|---|---|---|
| 1 | 0.000 | 0.000 | 0.000 | 0.00 | SPH(γ:∞) | nd : 1 |
| 2 | 0.000 | −2.671 | 23.477 | 0.11 | FFS | nd : 1.5709 νd : 33.8 |
| | c 2:−6.70971e−04 | c 3:−6.89097e−06 | c 4:−1.73100e−07 | | | |
| | c 5: 2.20912e−10 | c 6: 1.19811e−10 | c20:−2.00889e−04 | | | |
| | c21:−1.75941e−04 | c22:−8.50209e−07 | c23: 5.11966e−08 | | | |
| | c24:−3.37074e−10 | c40:−2.16244e−06 | c41:−2.00467e−08 | | | |
| | c42:−1.45047e−10 | c60:−6.92659e−09 | | | | |
| 3 | 0.000 | 0.000 | 40.934 | −26.12 | FFS | REFL |
| | c 2:−2.40411e−04 | c 3:−1.72149e−05 | c 4: 1.18334e−06 | | | |
| | c 5:−5.27765e−08 | c 6: 3.57474e−10 | c20:−6.20270e−04 | | | |
| | c21:−4.20319e−05 | c22: 7.40522e−07 | c23:−4.26268e−08 | | | |
| | c24:−1.54796e−09 | c40:−7.78929e−07 | c41: 7.22865e−09 | | | |
| | c42:−8.96016e−10 | c60:−2.02782e−10 | | | | |
| | c71:−1.20851e−02 | c72:−2.20068e−02 | c73: 2.38611e+01 | | | |
| 4 | 0.000 | −2.671 | 23.477 | 0.11 | FFS | REFL |
| | c 2:−6.70971e−04 | c 3:−6.89097e−06 | c 4:−1.73100e−07 | | | |
| | c 5: 2.20912e−10 | c 6: 1.19811e−10 | c20:−2.00889e−04 | | | |
| | c21:−1.75941e−04 | c22:−8.50209e−07 | c23: 5.11966e−08 | | | |
| | c24:−3.37074e−10 | c40:−2.16244e−06 | c41:−2.00467e−08 | | | |
| | c42:−1.45047e−10 | c60:−6.92659e−09 | | | | |
| 5 | 0.000 | 47.526 | 39.356 | 19.16 | FFS | REFL |
| | c 2:−2.85389e−03 | c 3:−6.29905e−05 | c 4:−2.13717e−06 | | | |
| | c 5:−1.78468e−07 | c 6:−1.15139e−08 | c20:−3.18336e−04 | | | |
| | c21:−1.93314e−04 | c22: 6.18834e−06 | c23:−4.10755e−07 | | | |
| | c24:−2.84304e−09 | c40: 2.72413e−05 | c41: 8.81204e−09 | | | |
| | c42:−6.13249e−08 | c60: 6.41016e−08 | | | | |
| 6 | 0.000 | 52.339 | 25.700 | −15.85 | FFS | REFL |
| | c 2: 1.25886e−02 | c 3: 5.08931e−04 | c 4: 9.81104e−05 | | | |
| | c 5: 9.64291e−07 | c 6:−5.99853e−07 | c20: 3.15586e−02 | | | |
| | c21: 2.59256e−04 | c22:−4.61093e−05 | c23:−1.82187e−06 | | | |
| | c24:−2.71726e−07 | c40: 3.13426e−05 | c41: 3.74668e−06 | | | |

TABLE 1-continued

| s | x | y | z | a | Surface shape | medium |
|---|---|---|---|---|---|---|
| | c42: 1.80333e-07 | c60: 1.00834e-07 | | | | |
| 7 | 0.000 | 57.037 | 9.872 | 8.05 | FFS | REFL |
| | c 2: 1.29105e-02 | c 3:-6.98017e-05 | c 4: 5.78863e-06 | | | |
| | c 5: 1.22881e-07 | c 6: 2.02049e-08 | c20: 1.27925e-02 | | | |
| | c21:-3.85872e-05 | c22: 8.24349e-06 | c23: 2.26598e-08 | | | |
| | c24:-1.46028e-08 | c40: 1.11422e-06 | c41:-1.62729e-07 | | | |
| | c42:-1.39739e-09 | c60: 1.18517e-08 | | | | |
| i | 0.000 | 72.340 | 26.643 | 8.19 | SPH(γ:∞) | |

$\theta in = 27.58°$
$\theta out = 2.82°$
$\theta out/\theta in = 0.10$
fymin = fy9 = 19.899
fy = fy99 = 19.898
fymin/fy = fy9/fy99 = 1

TABLE 2

| s | x | y | z | a | Surface shape | medium |
|---|---|---|---|---|---|---|
| 1 | 0.000 | 0.000 | 0.000 | 0.00 | SPH(γ:∞) | nd : 1 |
| 2 | 0.000 | 0.000 | 20.000 | 0.00 | FFS | nd : 1.5709 vd : 33.8 |
| | c 2:-1.31891e-03 | c 3:-1.43806e-05 | c 4:-2.82300e-07 | | | |
| | c 5:-3.40244e-08 | c 6:-2.63617e-09 | c20: 5.96894e-05 | | | |
| | c21:-1.78593e-05 | c22:-7.21428e-07 | c23:-9.26524e-08 | | | |
| | c24:-1.50776e-08 | c40:-3.62605e-06 | c41: 5.58001e-07 | | | |
| | c42: 2.76674e-08 | c60:-4.32837e-08 | | | | |
| 3 | 0.000 | 0.000 | 30.000 | -25.00 | FFS | REFL |
| | c 2:-1.99595e-03 | c 3:-1.17496e-04 | c 4:-1.61622e-07 | | | |
| | c 5:-1.16014e-07 | c 6:-1.83464e-09 | c20:-2.75587e-04 | | | |
| | c21: 9.26267e-05 | c22:-6.33502e-06 | c23:-8.44509e-08 | | | |
| | c24:-1.18723e-08 | c40: 4.32108e-07 | c41:-2.80054e-07 | | | |
| | c42: 2.96154e-08 | c60: 2.94011e-09 | | | | |
| | c71:-3.41608e-02 | c72:-2.90774e-03 | c73:-1.19053e+01 | | | |
| 4 | 0.000 | 0.000 | 20.000 | 0.00 | FFS | REFL |
| | c 2:-.31891e-03 | c 3:-1.43806e-05 | c 4:-2.82300e-07 | | | |
| | c 5:-3.40244e-08 | c 6:-2.63617e-09 | c20: 5.96894e-05 | | | |
| | c21:-1.78593e-05 | c22:-7.21428e-07 | c23:-9.26524e-08 | | | |
| | c24:-1.50776e-08 | c40:-3.62605e-06 | c41: 5.58001e-07 | | | |
| | c42: 2.76674e-08 | c60:-4.32837e-08 | | | | |
| 5 | 0.000 | 23.240 | 29.500 | 50.00 | FFS | nd : 1 |
| | c 2: 9.48955e-03 | c 3: 4.20005e-04 | c 4:-2.00451e-04 | | | |
| | c 5: 7.18783e-05 | c 6:-9.17372e-06 | c20:-5.26124e-03 | | | |
| | c21: 1.99262e-03 | c22: 5.73705e-05 | c23: 1.73142e-05 | | | |
| | c24:-8.17334e-06 | c40: 6.07030e-05 | c41:-5.72174e-06 | | | |
| | c42:-1.16665e-06 | c60: 8.40512e-07 | | | | |
| | c71:-9.80147e-03 | c72:-4.71557e-02 | c73: 5.39143e+01 | | | |
| 6 | 0.000 | 30.900 | 35.928 | 20.00 | FFS | REFL |
| | c 2: 5.77916e-03 | c 3:-4.14785e-04 | c 4: 5.96099e-05 | | | |
| | c 5:-5.03058e-06 | c 6: 2.18044e-07 | c20:-4.12937e-05 | | | |
| | c21: 2.47202e-04 | c22:-4.22472e-05 | c23:-9.50794e-06 | | | |
| | c24: 5.44287e-07 | c40: 1.13473e-05 | c41:-2.76385e-06 | | | |
| | c42: 1.66003e-06 | c60: 3.30047e-08 | | | | |
| | c71: 1.55201e-02 | c72:-6.67716e-02 | c73:-3.79921e+01 | | | |
| 7 | 0.000 | 32.984 | 24.110 | 30.00 | FFS | REFL |
| | c 2: 1.91837e-04 | c 3: 8.55197e-05 | c 4: 5.70890e-06 | | | |
| | c 5: 4.98727e-07 | c 6: 1.85530e-08 | c20: 5.24708e-03 | | | |
| | c21:-9.93613e-04 | c22: 1.05548e-05 | c23: 5.80218e-07 | | | |
| | c24:-1.80743e-07 | c40: 7.04080e-05 | c41:-1.28944e-07 | | | |
| | c42: 1.58215e-08 | c60:-8.70675e-08 | | | | |
| | c71: 6.31905e-03 | c72: 8.15673e-02 | c73:-3.11414e+01 | | | |
| i | 0.000 | 49.062 | 29.962 | 33.14 | SPH | |

$\theta in = 23.11°$
$\theta out = 15.79°$
$\theta out/\theta in = 0.68$
fymin = fy7 = 14.760
fy = fy67 = 13.607
fymin/fy = fy7/fy67 = 1.085

TABLE 3

| s | x | y | z | a | Surface shape | medium |
|---|---|---|---|---|---|---|
| 1 | 0.000 | 0.000 | 0.000 | 0.00 | SPH(γ:∞) | nd : 1 |
| 2 | 0.000 | 0.000 | 20.000 | 0.00 | FFS | nd : 1.5709 vd : 33.8 |
| | c 2:-7.42782e-04 | c 3:-7.68520e-06 | c 4:-5.73958e-08 | | | |
| | c20:-2.80521e-04 | c21:-3.64786e-05 | c22:-2.68280e-07 | | | |
| | c40:-1.31618e-07 | | | | | |
| 3 | 0.000 | 0.000 | 30.000 | -25.00 | FFS | REFL |
| | c 2:-1.47313e-03 | c 3: 2.20330e-05 | c 4:-1.28255e-07 | | | |
| | c20: 4.82579e-04 | c21: 1.22437e-04 | c22: 1.43515e-06 | | | |
| | c40: 1.06893e-06 | | | | | |
| | c71:-2.69341e-02 | c72:-2.15920e-03 | c73:-9.59382e+00 | | | |
| 4 | 0.000 | 0.000 | 20.000 | -0.00 | FFS | REFL |
| | c 2:-7.42782e-04 | c 3:-7.68520e-06 | c 4:-5.73958e-08 | | | |
| | c20:-2.80521e-04 | c21:-3.64786e-05 | c22:-2.68280e-07 | | | |
| | c40:-1.31618e-07 | | | | | |
| 5 | 0.000 | 23.240 | 29.500 | 50.00 | FFS | nd : 1 |
| | c 2: 4.29199e-03 | c 3: 4.88612e-05 | c 4: 1.21322e-05 | | | |
| | c20:-5.60720e-04 | c21: 2.81637e-04 | c22:-3.22594e-05 | | | |
| | c40:-9.48272e-06 | | | | | |
| | c71: 1.01860e-03 | c72:-3.17030e-02 | c73: 4.37016e+01 | | | |
| 6 | 0.000 | 33.199 | 37.856 | 10.00 | FFS | REFL |
| | c 2: 2.21838e-03 | c 3:-7.49306e-05 | c 4:-4.37227e-06 | | | |
| | c20:-7.67444e-05 | c21:-4.85349e-04 | c22:-1.89161e-05 | | | |
| | c40: 3.79407e-06 | | | | | |
| | c71: 6.35746e-03 | c72:-2.53567e-02 | c73:-5.97322e+01 | | | |
| 7 | 0.000 | 44.199 | 18.804 | 6.00 | FFS | REFL |
| | c 2:-4.48954e-04 | c 3: 4.78120e-05 | c 4:-2.73332e-06 | | | |
| | c20:-1.69655e-03 | c21: 1.99284e-05 | c22:-1.01796e-05 | | | |
| | c40: 3.80924e-06 | | | | | |
| | c71:-2.56547e-03 | c72: 3.13436e-02 | c73: 3.70795e+01 | | | |
| 8 | 0.000 | 60.927 | 37.382 | 2.00 | FFS | REFL |
| | c 2:-1.40310e-04 | c 3:-4.48990e-05 | c 4:-1.35312e-06 | | | |
| | c20:-1.19575e-03 | c21: 8.62044e-05 | c22:-9.16717e-06 | | | |
| | c40:-3.87088e-06 | | | | | |
| | c71:-5.14069e-02 | c72:-1.97296e-03 | c73:-4.31929e+01 | | | |
| i | 0.000 | 73.240 | 21.622 | -18.00 | SPH | |

$\theta in = 31.68°$
$\theta out = 18.96°$
$\theta out/\theta in = 0.60$
fymin = fy8 = 27.790
fy = fy68 = 28.107
fymin/fy = fy8/fy68 = 0.989

Figure 6:
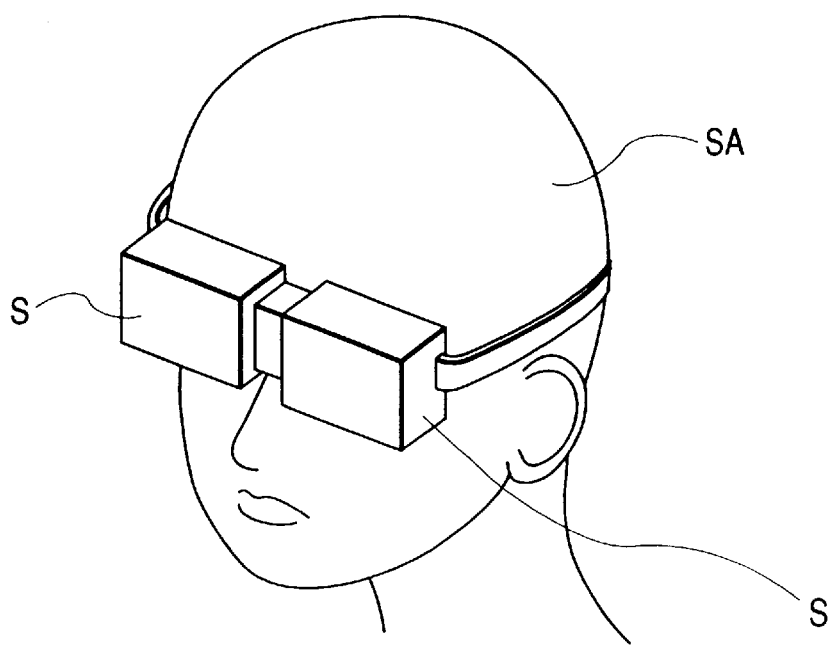
FIG. 6 is an illustration of the head mount display of the present invention.
Figure 7:
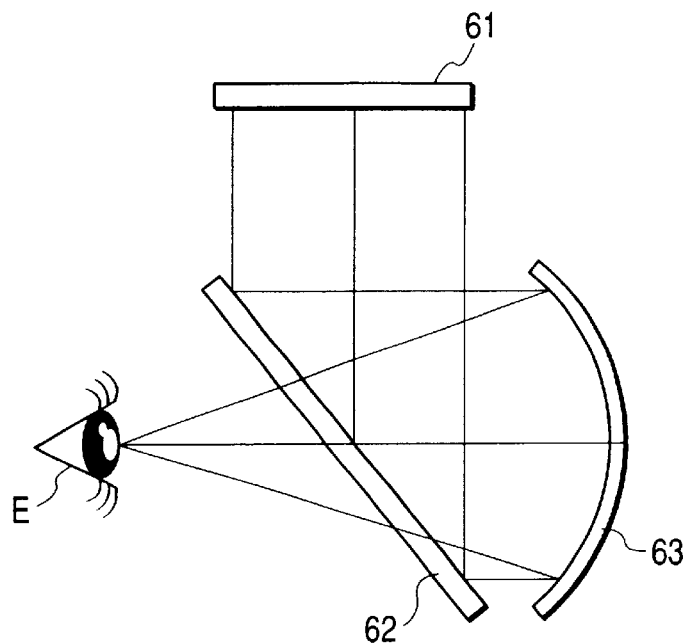
FIG. 7 is a schematic view of the essential portions of an image displaying apparatus according to the prior art.
Figure 8:
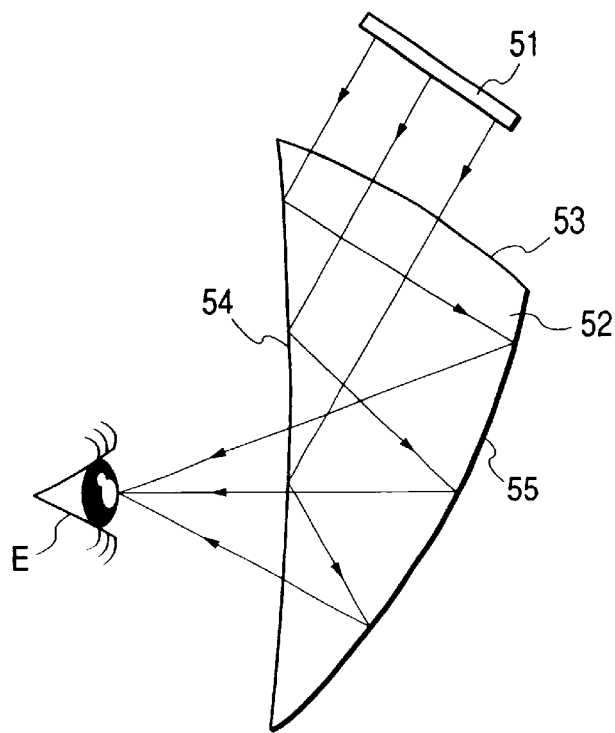
FIG. 8 is a schematic view of the essential portions of an image displaying apparatus according to the prior art.

FIG. 6 is an illustration when the image displaying apparatus S of each embodiment of the present invention is constructed so as to be provided in a pair for the left and right eyes of an observer SA, whereby a both eye type head mount display is constructed.

In the present invention, if for example, the parallax of the both eyes is used as an image to be displayed on the display element, there can be constructed an image observation system which makes stereoscopic vision possible.

Of course, it is also possible to make a single-eye type HMD provided with only one unit not always for both eyes, but for one of left and right eyes.

According to the present invention, it is possible to achieve an optical system which can generally be easily made compact and light in weight and wide in angle of field when image information displayed on display means such as a liquid crystal display is observed, and an image displaying apparatus using the same.

Particularly, according to the present invention, it becomes easy to achieve an optical system which is thin and light in weight and has a wide angle of field, and by using such optical system, it becomes easy to achieve an image displaying apparatus or an image pickup apparatus which is compact and light in weight and has a wide angle of field.

What is claimed is:

1. An optical system for directing a beam from display means to a predetermined position, wherein a ray emerging from the center of the display surface of said display means and passing through the center of the exit pupil of said optical system is defined as a central field angle principal ray, said optical system comprising:

a first optical element having a plurality of eccentric reflecting surfaces, each of the eccentric reflecting surfaces having power and being eccentric relative to the central field angle principal ray, and an eccentric mirror system comprising at least one eccentric mirror having positive power and eccentric relative to the central field angle principal ray, wherein the beam from said display means is condensed and directed to said first optical element by said eccentric mirror system; and wherein said optical system has refractive power capable of forming an intermediate image in an optical path leading from the display means to the predetermined position;

wherein the central field angle principal ray does not intersect on the optical path in said eccentric mirror system; and further comprising at least two surfaces, each of which has power, respectively disposed in the optical path before the intermediate image is formed and between the intermediate image and the exit pupil of said optical system.

2. An optical system according to claim 1, wherein said first optical element has a reflecting and transmitting surface having power serving as an eccentric reflecting surface and a transmitting surface.

3. An optical system according to claim 2, wherein said reflecting and transmitting surface has a common area on which both of a reflected beam and a transmitted beam impinge, and the reflection on at least said common area is the internal total reflection in said first optical element.

4. An optical system according to claim 3, wherein a reflecting film is formed on a portion of said reflecting and transmitting surface.

5. An optical system according to claim 1, wherein the intermediate image is formed larger than an image displayed on said display means.

6. An optical system according to claim 1, wherein at least a portion of said intermediate image is formed in the first optical element.

7. An optical system according to claim 1, wherein the display surface of said display means is a flat surface, and said intermediate image is curvedly formed.

8. An optical system according to claim 1, wherein at least one of said eccentric reflecting surfaces is of a non-rotation-symmetrical shape having only one symmetrical plane.

9. An optical system according to claim 1, wherein a beam passing through said first optical element is reflected three or less times.

10. An image display apparatus comprising:
an optical system according to claim 1; and
displays means for displaying image information.

11. A head mount display comprising:
an image display apparatus according to claim 10; and
a head mount mechanism.

12. An optical system according to claim 1, wherein when in a plane formed by said central field angle principal ray, the angle formed when rays passing from the center of the display surface of said display means to the opposite ends of said exit pupil emerge from said display means and are incident of a first mirror of said eccentric mirror system is defined as θin, and the angle formed when the rays passing from the center of the display surface of said display means to the opposite ends of said exit pupil emerge from the last eccentric mirror of said eccentric mirror system is defined as θout, and the angle formed when the point of intersection is formed on the reflected side when the rays passing from the center of the display surface of said display means to the opposite ends of said exit pupil are extended is defined as positive, and the angle formed when the point of intersection is formed on the opposite side is defined as negative, said eccentric mirror system is designed so as to satisfy $$0 \leq \theta out/\theta in \leq 1.$$

13. An optical system according to claim 1, wherein when the combined focal length of the meridional cross-section of said eccentric mirror system is defined as fy, and of the eccentric mirrors constituting said eccentric mirror system, the shortest local meridional cross-section focal length is defined as fy min, $$0.5 \leq fy\ min/fy \leq 2$$

is satisfied.

14. An optical system for directing a beam from display means to a predetermined position, wherein a ray emerging from the center of the display surface of said display means and passing through the center of the exit pupil of said optical system is defined as a central field angle principal ray, said optical system comprising:

a first optical element having a plurality of eccentric reflecting surfaces, each of the eccentric reflecting surfaces having power and being eccentric relative to the central field angle principal ray, and an eccentric mirror system comprising at least one eccentric mirror having positive power and eccentric relative to the central field angle principal ray, wherein the beam from said display means is condensed and directed to said first optical element by said eccentric mirror system, wherein when in a plane formed by said central field angle principal ray, the angle formed when rays passing from the center of the display surface of said display means to the opposite ends of said exit pupil emerge from said display means and are incident of a first mirror of said eccentric mirror system is defined as θin, and the angle formed when the rays passing from the center of the display surface of said display means to the opposite ends of said exit pupil emerge from the last eccentric mirror of said eccentric mirror system is defined as θout, and the angle formed when the point of intersection is formed on the reflected side when the rays passing from the center of the display surface of said display means to the opposite ends of said exit pupil are extended is defined as positive, and the angle formed when the point of intersection is formed on the opposite side is defined as negative, said eccentric mirror system is designed so as to satisfy $$0 \leq \theta out/\theta in \leq 1.$$

15. An optical system according to claim 14, wherein the intermediate range is formed larger than the image displayed on the display means.

16. An optical system according to claim 14, wherein at least a portion of said intermediate image is formed in the first optical element.

17. An optical system according to claim 14, wherein the display surface of said display means is a flat surface, and said intermediate image is curvedly formed.

18. An optical system according to claim 14, wherein at least one of said eccentric reflecting surfaces is of a non-rotation-symmetrical shape having only one symmetrical plane.

19. An optical system according to claim 14, wherein a beam passing through said first optical element is reflected three or less times.

20. An optical system for directing a beam from display means to a predetermined position, wherein a ray emerging from the center of the display surface of said display means and passing through the center of the exit pupil of said optical system is defined as a central field angle principal ray, said optical system comprising:

a first optical element having a plurality of eccentric reflecting surfaces, each of the eccentric reflecting surfaces having power and being eccentric relative to the central field angle principal ray, and an eccentric mirror system comprising at least one eccentric mirror having positive power and eccentric relative to the central field angle principal ray, wherein the beam from said display means is condensed and directed to said first optical element by said eccentric mirror system, wherein the central field angle principal ray does not intersect on the optical path in said eccentric mirror system; and wherein when the combined focal length of the meridional cross-section of said eccentric mirror system is defined as fy, and of the eccentric mirrors constituting said eccentric mirror system, the shortest local meridional cross-section focal length is defined as fy min, $0.5 \leq fy \text{ min}/fy \leq 2$.

is satisfied.

21. An optical system for imaging, wherein a ray incident from the entrance pupil of said optical system and passing to the center of the imaging plane is defined as a central field angle principal ray, said optical system comprising:

a first optical element having a plurality of eccentric reflecting surfaces, each of the eccentric reflecting surfaces having power and being eccentric relative to the central field angle principal ray; and an eccentric mirror system comprising at least one eccentric mirror having positive power and eccentric relative to the central field angle principal ray, wherein a beam from the entrance pupil passes through said first optical element and is condensed and directed to an imaging position;

wherein the central field angle principal ray does not intersect on the optical path in said eccentric mirror system; and further comprising at least two surfaces, each of which has power, respectively disposed in an optical path before an intermediate image is formed and between the intermediate image and the exit pupil of said optical system.

22. An image pickup apparatus comprising:

an optical system according to claim 21; and an image pickup means for picking up image information formed by the optical system.

* * * * *

UNITED STATES PATENT AND TRADEMARK OFFICE
CERTIFICATE OF CORRECTION

PATENT NO.     : 6,853,356 B2
DATED          : February 8, 2005
INVENTOR(S)    : Kazutaka Inoguchi It is certified that error appears in the above-identified patent and that said Letters Patent is hereby corrected as shown below:

<u>Title page,</u>
Item [56], References Cited, U.S. PATENT DOCUMENTS, insert
-- 2001-009478 7/2001 Yamazaki et al. ............... 356/630 --.

<u>Column 1,</u>
Line 16, "has" should read -- have --.

<u>Column 2,</u>
Line 23, "once" should read -- first --.

<u>Column 3,</u>
Line 32, "is" should read -- are --.

<u>Column 4,</u>
Line 9, "less" should read -- fewer --.
Line 39, "surface" should read -- surfaces --.

<u>Column 6,</u>
Line 33, "expression." should read -- expressions. --.
Line 46, "6*y4)z19*" should read -- 6*y4)+z19* --.
Line 66, "$v$d," should read -- $v$d, --.

<u>Column 7,</u>
Line 1, "$v$d," should read -- $v$d, --.
Line 45, "fy mn" should read -- fy min --.

<u>Column 8,</u>
Line 43, "Lo" should read -- LO --.
Line 47, "and" should read -- and are --.

<u>Column 10,</u>
Line 60, "emerges" should read -- and emerges --.

<u>Column 14,</u>
Line 47, "on the" should read -- on the --.

<u>Column 15,</u>
Line 17, "what" should read -- to what --.

<u>Column 16,</u>
Table 1, "vd = 33.8" should read -- $v$d = 33.8 --.

UNITED STATES PATENT AND TRADEMARK OFFICE
CERTIFICATE OF CORRECTION

PATENT NO. : 6,853,356 B2
DATED : February 8, 2005
INVENTOR(S) : Kazutaka Inoguchi It is certified that error appears in the above-identified patent and that said Letters Patent is hereby corrected as shown below:

Column 17,
Table 2, "vd = 33.8" should read -- $\nu$d = 33.8 --.

Column 18,
Table 3, "vd = 33.8" should read -- $\nu$d = 33.8 --.

Column 19,
Line 54, "less" should read -- fewer --.
Line 57, "displays" should read -- display --.
Line 67, "of a" should read -- upon a --.

Column 20,
Line 20, "$0.5 \leqq$ fy min/fy $\leqq 2$" should read -- $0.5 <$ fy min/fy $< 2$ --.
Line 42, "of a" should read -- on a --.

Column 21,
Line 7, "less" should read -- fewer --.

Column 22,
Line 1, "$0.5 \leqq$ fy min/fy $\leqq 2$" should read -- $0.5 <$ fy min/fy $< 2$ --.

Signed and Sealed this

Eleventh Day of April, 2006

JON W. DUDAS
*Director of the United States Patent and Trademark Office*